United States Patent
Kaji et al.

(10) Patent No.: US 7,498,927 B1
(45) Date of Patent: Mar. 3, 2009

(54) SECURITY ALARM

(75) Inventors: Koji Kaji, Tokyo (JP); Tatsuya Michishige, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 172 days.

(21) Appl. No.: 11/200,734

(22) Filed: Aug. 10, 2005

(51) Int. Cl.
*B60R 25/10* (2006.01)

(52) U.S. Cl. .............. 340/426.1; 340/328; 340/426.13; 340/426.25; 340/426.36; 340/429; 340/691.5

(58) Field of Classification Search .............. 340/426.1, 340/426.24, 426.25, 426.28, 426.36, 426.13, 340/429, 331, 328, 326, 527–529, 691.1, 340/691.4, 691.5
See application file for complete search history.

(56) References Cited

U.S. PATENT DOCUMENTS

| | | | | |
|---|---|---|---|---|
| 3,585,584 A | * | 6/1971 | Behrend | ...................... 340/528 |
| 5,130,695 A | * | 7/1992 | Scarbrough et al. | ......... 340/527 |
| 5,157,375 A | | 10/1992 | Drori | |
| 5,245,694 A | * | 9/1993 | Zwern | ........................ 704/200 |
| 5,563,577 A | * | 10/1996 | Adkins | .................. 340/426.28 |
| 5,612,669 A | * | 3/1997 | Allen et al. | .................. 340/429 |
| 6,734,788 B1 | * | 5/2004 | Winner | .................... 340/426.1 |

* cited by examiner

*Primary Examiner*—Thomas J Mullen
(74) *Attorney, Agent, or Firm*—Haynes and Boone LLP

(57) ABSTRACT

A security alarm system for a vehicle having an alert device, the alert device including an audible alert device, and the security alarm system comprising an intrusion detector for detecting an intrusion event on the vehicle; and an alert controller for controlling the alert device, wherein the alert controller generates an activate instruction to activate the alert device responsive to the intrusion event detected by the intrusion detector and generates a deactivate instruction to deactivate at least the audible alert device after a first predetermined time interval from the generation of the activate instruction, and wherein the alert controller further prevents a generation of an activate instruction of at least the audible alert device during at least a second predetermined time interval after the generation of the deactivate instruction.

11 Claims, 10 Drawing Sheets

Alarm System Element Condition (trunk closed IGN OFF)

Alarm System Element Condition (trunk closed IGN OFF)

Alarm System Element Condition (trunk closed IGN OFF)

Alarm System Element Condition (trunk closed IGN OFF)

Alarm System Element Condition (trunk closed)

Alarm System Element Condition (trunk closed IGN OFF)

Alarm System Element Condition (trunk closed)

Alarm System Element Condition (trunk closed)

SECURITY ALARM

FIELD OF THE INVENTION

The present invention relates to the field of security alarm for vehicles and more particularly, to alert activation and deactivation patterns and alert devices of such vehicle security alarm.

BACKGROUND OF THE INVENTION

In recent times, in order to prevent vehicle theft, many vehicles are equipped with security alarm systems. In such alarm systems, the vehicle typically has an intrusion detector such as the vehicle impact sensor for detecting a vibration of the vehicle caused by an intrusion event on the vehicle. When the detector detects the intrusion, it activates an alert device. A warning is then accomplished through the alert device with the loud alarm alerts and the flashing of lights (hazard light flashing).

For such security alarm systems, local ordinances typically prescribe the times for which such alarm alerts can continue, in order to reduce noise pollution and to prevent depletion of the car battery and other attendant problems.

U.S. Pat. No. 5,157,375 discloses a security alarm system in which the alarm alert is stopped after continuing for a certain time period, and it is prevented from resuming until the system is either armed again or disarmed. That is, if the alert continues for a set period of time, unless the system is disarmed and armed again, the security alarm system will no longer operate.

However, with the invention disclosed in U.S. Pat. No. 5,157,375, after alerts based on the same sensor have sounded for a certain period of time, any audible alerts based on that specific sensor may be stopped. Thus, a problem results in that the effectiveness of such alerts in preventing theft is reduced.

Therefore, a security alarm system for vehicles which can continue providing alerts to maximize deterrence of unauthorized intruders, while still reducing the potential for undesirable repetitions of alarm cycles, is highly desired.

SUMMARY OF THE INVENTION

According to the primary aspect of the present invention, there is provided a security alarm system for a vehicle having an alert device, the alert device including an audible alert device, and the security alarm system comprising: an intrusion detector for detecting an intrusion event on the vehicle; and an alert controller for controlling the alert device, wherein the alert controller generates an activate instruction to activate the alert device responsive to the intrusion event detected by the intrusion detector and generates a deactivate instruction to deactivate at least the audible alert device after a first predetermined time interval from the generation of the activate instruction, and wherein the alert controller further prevents a generation of an activate instruction of at least the audible alert device during a second predetermined time interval after the generation of the deactivate instruction.

With this structure, after the second predetermined time interval has passed, the alert controller can generate the activate instruction to activate the audible alert device again. Therefore, the present invention can continue providing alerts to maximize deterrence of unauthorized intruders, while still reducing the potential for undesirable repetitions of alarm cycles.

According to one embodiment of the present invention, the alert device includes a non-audible alert device, for which the alert controller does not prevent the generation of the activate instruction during at least the second predetermined time interval. In this case, it is preferable that the non-audible alert device is a flashing light alert device.

According to the one other embodiment of the present invention, the intrusion event includes an opening/closing of a vehicle door and at least one other event, and after the opening of the vehicle door and after the first predetermined time interval, the alert controller prevents the generation of the activate instruction until the closing of the vehicle door, after which the alert controller can generate the activate instruction responsive to the intrusion event.

According to the one further embodiment of the present invention, the alert controller varies an alert pattern of the alert device. In this case, it is preferable that the alert controller varies a sound volume of the audible alert device in accordance with the detected intrusion event. Also, it is desirable that the alert controller sets a greater sound volume for the audible alert device activated responsive to the door opening than for the audible alert device activated responsive to the other event. Further, it is preferable that the alert controller varies a sounding pattern of the audible alert device.

According to the one yet other embodiment of the present invention, the alert controller makes a detection or non-detection decision, at a predetermined decision interval, regarding the detection of the intrusion event by the intrusion detector, where the decision interval is shorter than the first predetermined time interval, and further where after the generation of the activate instruction, the alert controller stops the activation of the alert device in response to a non-detection decision.

Those skilled in the art will appreciate these and other advantages and benefits of various embodiments of the invention upon reading the following detailed description of the preferred embodiments with reference to the below-listed drawings.

DETAILED DESCRIPTION OF THE PREFERRED EMBODIMENTS

Embodiments of the present invention are described below in accordance with accompanying drawings.

Figure 1:
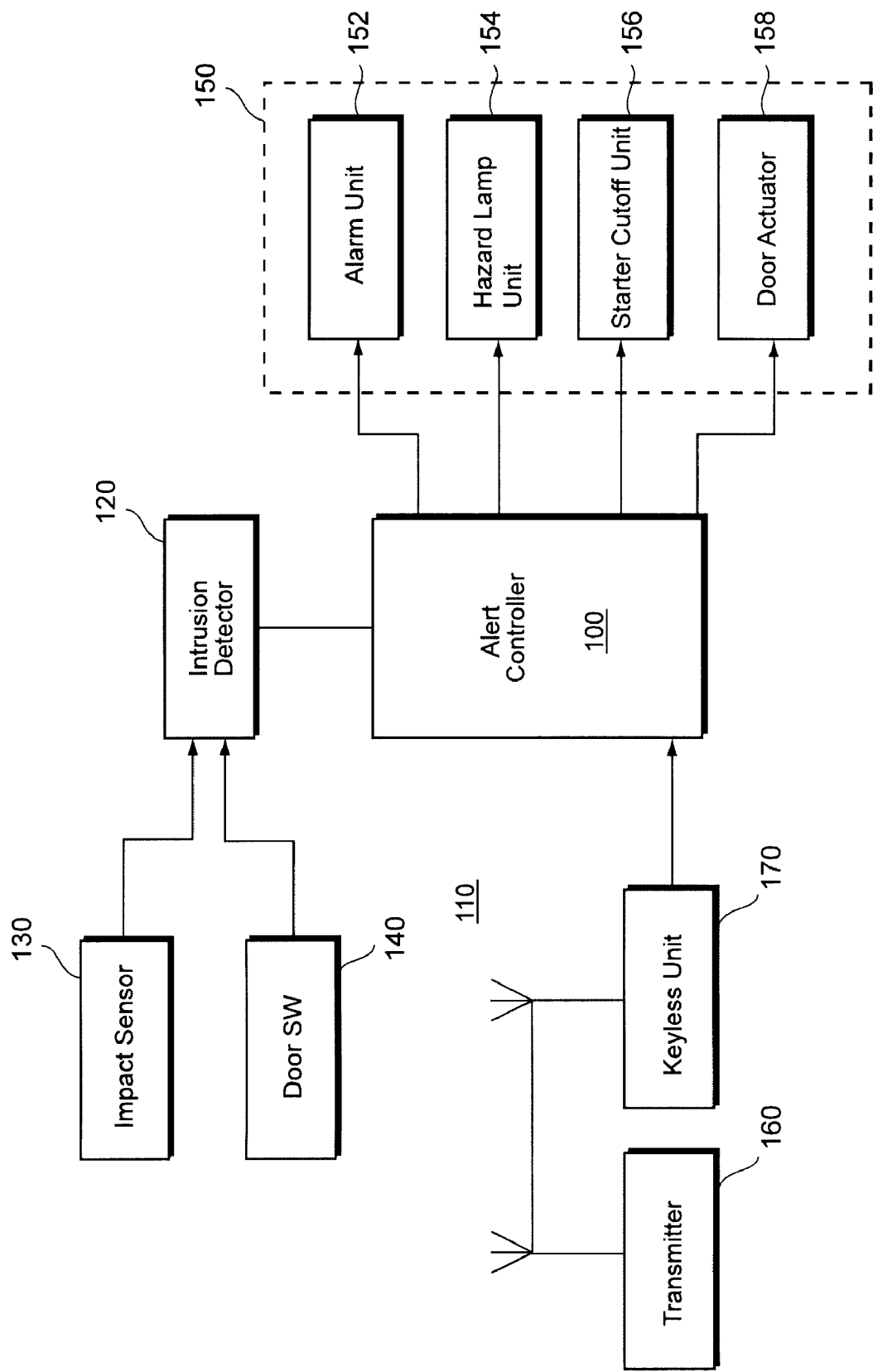
FIG. 1 is a simplified block diagram showing the principal structural elements in a security alarm system employing the present invention.

As shown in the simple block diagram of FIG. 1, the present embodiment has an alert controller 100 provided in the security alarm system 110 of a vehicle, which holds the function of controlling, through activating and deactivating, the various alert devices of the security alarm system of the present invention. The alert controller 100 comprises a microcomputer with internal memory capacity, as commonly known by those of ordinary skill in the art, for accomplishing these functions.

Coupled to the alert controller 100 is an intrusion detector 120 for receiving output signals from sensors consisting of an impact sensor 130 for detecting a vibration of a vehicle body, and a door switch (SW) 140 for detecting the opening-closing of the doors. Such sensors may be motion or vibration sensors or the like, or sensors wired as an example as switches on the vehicle doors. Upon receiving signals from the sensors indicating their tripping, the intrusion detector 120 then generates active signals to the alert controller 100. Thus, the intrusion detector 120 essentially has the function of detecting intrusion events, that is, attempts to make unauthorized intrusions into protected areas (zones) of a vehicle or otherwise have unauthorized access to the vehicle.

The system further employs an alert unit 150, including a plurality of alert devices coupled to the controller unit. Such devices may include both audible and non-audible alert devices. The alert unit may include an alarm unit 152 for operating audible alerts, a hazard lamp unit 154 for flashing the hazard lights, and a starter cutoff unit 156 for disabling the operation of the starter/ignition for the engine. It may also include a door actuator unit 158 for locking and unlocking the door.

The intrusion detector 120 is programmed to essentially monitor the status of each of the sensors. Based on signals output from the sensors, the intrusion detector 120 signals the alert controller 100, which then generates activate instructions to activate the various elements of the alert unit 150. In this way, the system 110 issues alerts to call attention to potential intruders and deter such intrusions.

A remote transmitter 160 may be provided, for enabling the user to communicate with the system 110 and the alert controller 100 via a control instruction signal output from the transmitter to a keyless unit (keyless entry unit) 170 coupled to the system 110. This signal is provided to the alert controller 100.

It is important to note that such user communications means may also use other methods as commonly known in the art, such as switches directly coupled to the alert controller. Additionally, the above-described sensors may encompass other sensors and triggers as commonly known in the art, such as ultrasound sensors and vibration or motion detectors, and the above-described alert elements may also comprise other commonly known controlled devices, such as sirens, hood locking devices, and so forth. All such conventionally known devices and methods are intended to be encompassed within the present disclosure.

Based on the control signal from the remote transmitter 160, the system 100 then may output an instruction signal to the door actuator 158, to achieve the locking/unlocking of the door(s).

Upon receiving a door locking instruction, the security alarm system typically becomes armed and enters a sensor monitoring state. Then, according to outputs from the impact sensor 130 and the door switch 140, the security alarm system 110 functions via the alarm alerts 152, hazard alerts 154 and the starter/ignition cutoff 156, to warn off and call attention to potential intruders, and to deter theft.

Figure 2:
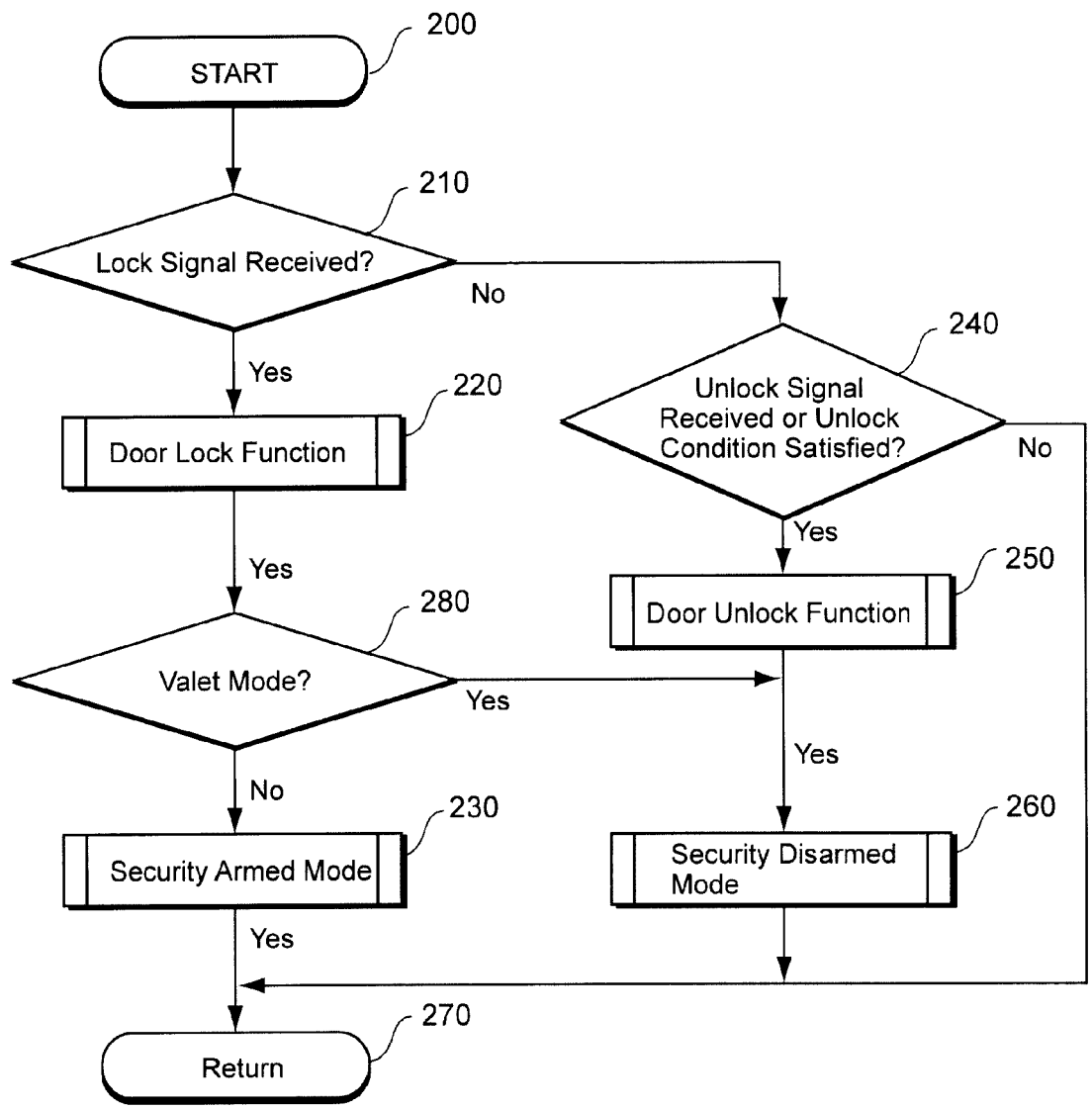
FIG. 2 is a flow diagram illustrating the operation of the security alarm system generally depicted in FIG. 1, in conjunction with the door lock.

Referring now to FIG. 2, showing the overall flow of the various operational modes, the arming of the security alarm system is essentially linked to the operation of the door lock. Upon an "on" or door lock signal from the transmitter (step 210), the system 100 issues an instruction to cause the door actuator to lock the door (step 220) and transfers the system to an armed mode (operational mode) (step 230). Upon receiving an unlock signal from the transmitter or other condition that meets the requirements for unlocking (step 240), the system 110 unlocks the door (step 250) and transfers it to a disarmed mode (non-operational mode) (step 260). In either case, the operation then returns (step 270) to start (step 200), for the system to continue monitoring.

Additionally, the security alarm system of the present invention can be equipped with a valet mode. After receiving a door lock signal, if the system detects that the user has selected this valet mode (step 280), the system remains in a disarmed mode even if the door lock is turned on at step 220. Thus, the valet mode is basically a security non-operational mode.

Figure 3:
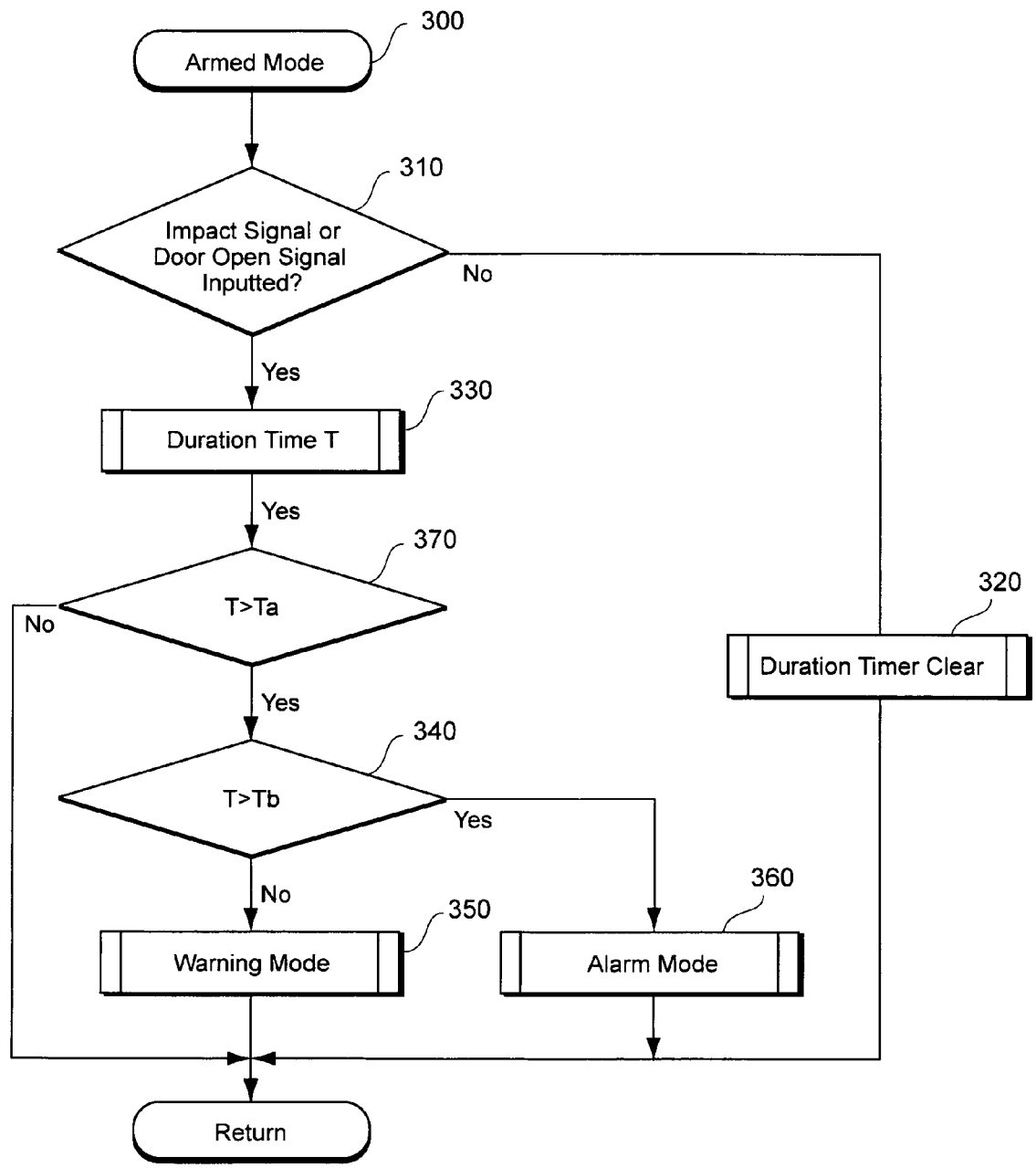
FIG. 3 is a flow diagram illustrating the operation of the security alerts in the armed mode.

FIG. 3 shows the flow of operations of the security alerts, once it has entered an armed state (step 300) as described above. In accordance with this aspect of the present invention, the impact sensor 130 is arranged so that when a vibration of the vehicle exceeds a predetermined value, the impact sensor outputs an "on" signal, or impact signal, as the impact output.

The intrusion detector 120 confirms receipt of this sensor tripping signal, at step 310, and may notify the alert controller 100 accordingly. If no such signal is received, the system clears a duration timer (step 320) and returns to a sensor monitoring state. If the system receives an impact signal, the alert controller 100 is programmed to track the continuous input time T for this impact signal (step 330).

When the system receives an impact sensor output continuously for a period of time Ta (step 370), the alert controller generates an activate instruction to activate a "warning alert" device or devices (step 350). When the system continuously receives that intrusion event output for longer than a period of time Tb (where Tb>Ta) (step 340), the alert controller activates an "alarm alert" device or devices (step 360).

Thus, if the alarm alert is the full warning, the warning alert simply becomes an initial stage type of alert. This warning alert stage avoids setting off an alarm alert for any inadvertent detections by the sensor. The system is arranged so that only a continuous shaking of the vehicle activates the alarm alert.

To further prevent undesired operations of the alerts, the system is arranged so that, after the impact signal is input, it enters the warning mode only after a predetermined period of time. When the continuous input time T of the impact signal does not satisfy a predetermined time Ta (where Ta<Tb) at step 370, no warning alert occurs. In this way, it can be arranged that the system transfers to a warning stage in the time between Ta and Tb.

With reference to the door switch 140, this can be a conventional on-off switch or other switch as commonly known in the art. Upon detecting the opening of the door, it outputs an "on" signal, or door open signal. Similarly to the above-described flow for the impact signal, when the intrusion detector 120 receives this "on" signal continuously for a period of time Ta, it then instructs the alert controller 100 accordingly, which then decides to generates an activate instruction to activate a "warning alert" device or devices (step 350). When the intrusion detector 120 continuously receives the "on" signal for longer than a period of time Tb (where Tb>Ta), the alert controller 100 causes the activation of an "alarm alert" device or devices (step 360). Alternatively, one can also program the alert controller 100 so that the alarm alert is operated at any time that the door switch is in an "on" state, to provide alarm alerts for any opening of the door while the system is in an armed mode.

To allow the user to further distinguish among various levels of intrusion threats, an audible alert upon the opening-closing of a door can have a greater volume than that of the audible alert activated by the impact sensor. This may notify the vehicle owner of an actual intrusion into the vehicle. Furthermore, as described below, the louder audible alert activated by the opening of a door typically continues for a first predetermined time such as 3 minutes. Thus, this alert can have a greater deterrent effect towards unauthorized intruders.

It should be noted that the present description is intended to encompass other possible variations on the alert patterns of the various alert devices, as is commonly known in the art. The sound volume of an audible alert device may also be increased or decreased depending on the nature of the detected intrusion event.

Figure 4:
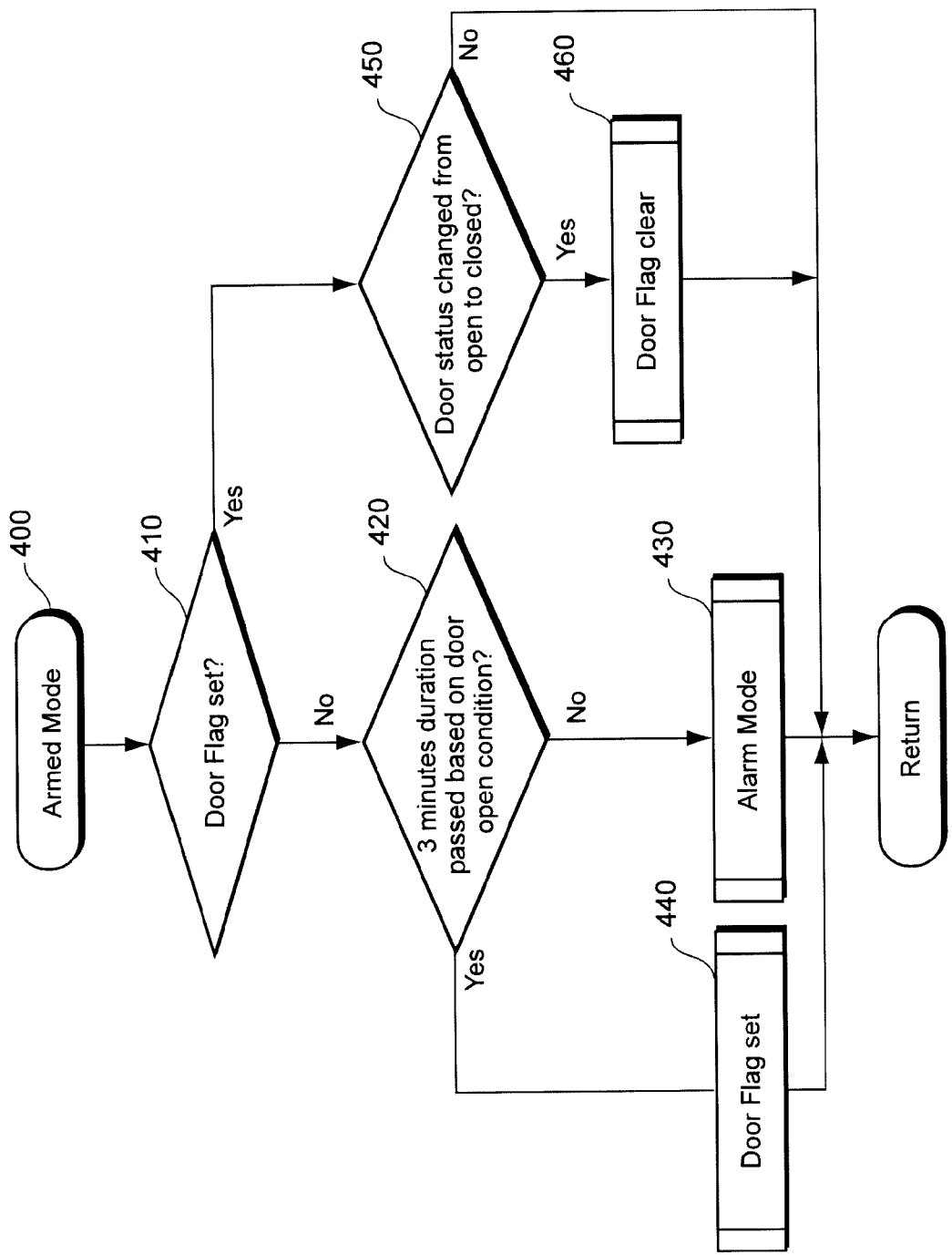
FIG. 4 is a flow diagram illustrating the operation of the security alerts in the armed mode, based on a door opening.

The present invention may further utilize a flow of operations using a door flag, as illustrated in FIG. 4. This arrangement ensures that, once the audible alert has been activated for 3 minutes by the opening of a door, any such alerts based on door openings are prohibited from occurring until the door is closed again. This again reduces noise pollution.

Essentially, upon entering the armed mode at step 400, the alert controller first determines whether a door flag has been set at step 410, indicating the activation of an audible alert by the opening of a door. If not, and if the 3 minute duration has not yet expired at step 420, the security alarm system enters the alarm mode at step 430. If 3 minutes of operation of the audible alert has passed, then the alert controller is programmed to set the door flag at step 440, thereby preventing any further resumption of the audible alert until the door is closed again.

If the alert controller determines that the door flag has been set at step 410, it checks to see if the door has been closed, at step 450. If so, it clears the door flag at step 460, to enable further re-activations of the audible alerts by the opening of a door. Thus, unlike conventional systems, the present invention allows the re-activation of the audible alert based on a door opening, even if such an event has already occurred, without requiring the disarming and rearming of the system.

Figure 5:
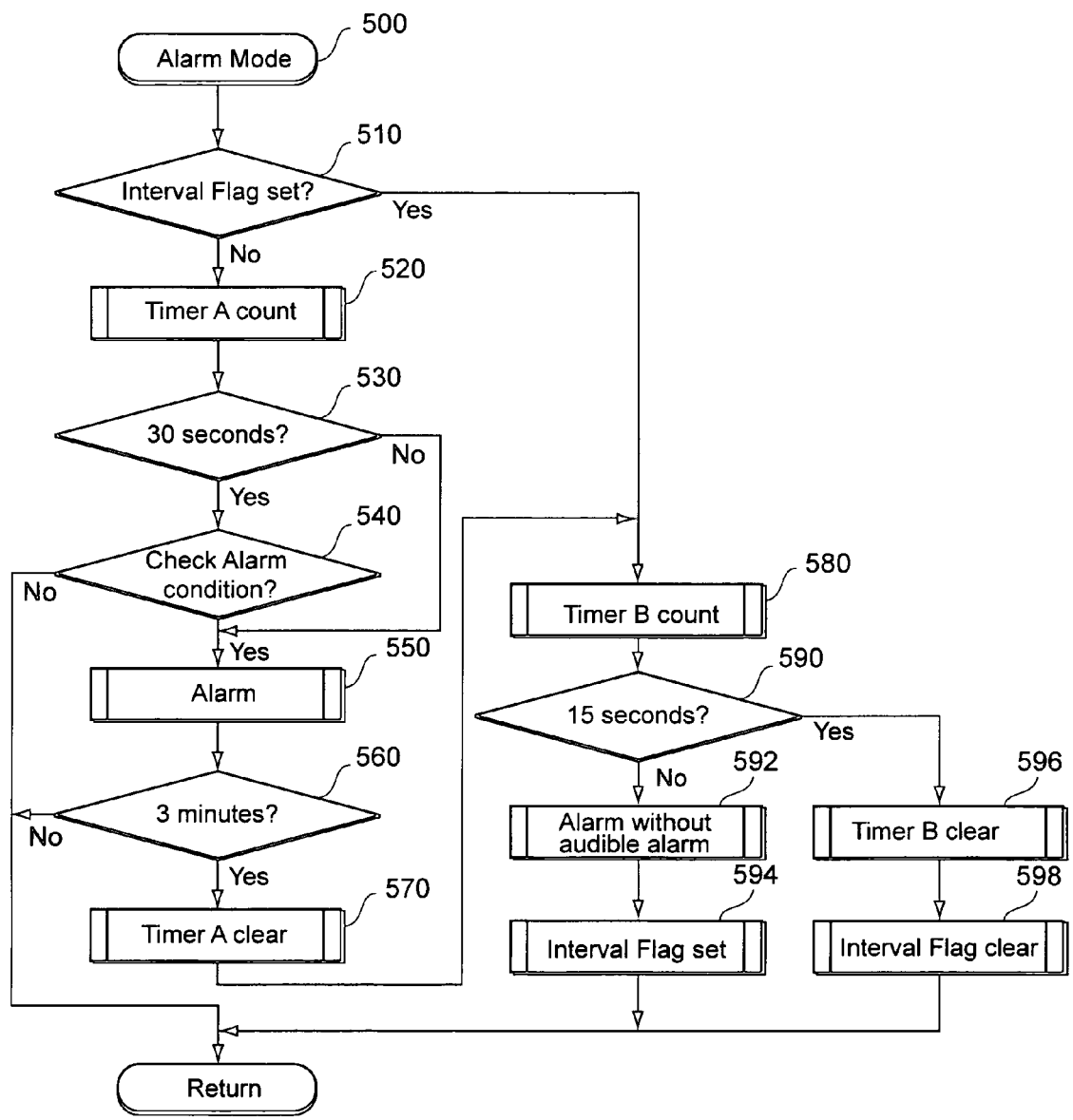
FIG. 5 is a flow diagram illustrating the operation of the security alerts in the alarm mode.

FIG. 5 illustrates the flow of operations when the security alarm system enters the above-described "alarm alert" stage. Essentially, the "alarm alert" is set up to operate with a 3 minute maximum time period for continuous operation. After the 3 minutes passes, any audible alarm signal is prevented from operating for a second predetermined time such as 15 seconds. The alert controller generates a deactivate instruction to deactivate any audible alert device, and prevents the generation of an activate instruction during those 15 seconds.

If, after those 15 seconds, the conditions for operating the alarm still exist or arise, the alarm alert is performed again, with another 3 minute maximum time period for its continuation. In other words, the alarm alert is operated on cycles consisting of 3 minutes of audible sounding and 15 seconds where the sounds are silenced. This pattern allows the reduction of potential for noise pollution, battery drain and other problems resulting from repetitive cycling of the alarm.

Once the system enters the alarm mode (step 500), the alert controller 100 determines whether an interval flag should be set, for entering the 15 second silent alert interval (step 510). If not, the alert controller 100 causes the commencement of a count at a timer A (step 520). The timer A is used to track the 3 minute periods for the system.

In this aspect of the present invention, at each fixed cycle (of 30 seconds, for example) (step 530), the controller checks and decides whether the conditions for operating the alarm alert exist (step 540). In other words, the alert controller decides, at a fixed interval, if the intrusion detector has detected an intrusion event. If such alarm conditions have been met, the alarm alert is commenced (step 550) and continued for a maximum of 3 minutes (step 560).

It should be noted that each period between such decisions (step 530) is 30 seconds long. Thus, once such conditions arise, the alarm continues operation for a minimum of 30 seconds.

If at step 540, such conditions for operating the alarm alert are not met, the alarm alert is silenced at that point.

After the 3 minutes, the controller clears the timer A (step 570) and instructs a timer B (step 580) to track whether the "silent" interval maximum of 15 seconds has been reached (step 590). If no, 15 seconds has not been reached and an alarm alert without an audible alarm can be operated (step 592), and an interval flag is set (step 594) to continue the interval. If yes, 15 seconds has been reached and the timer B and the interval flag are cleared (steps 596 and 598).

The non-audible alarm during those 15 seconds may consist of the flashing of the hazard lights or other lights and the disablement of the ignition. For the hazard lamp alert, the flashing patterns can also be varied during the 3 minute and 15 second intervals. For example, the flashing periods can be varied during the 15 seconds, to maximize the deterrent and attention-calling effects.

Thus, after sounding for a first predetermined time period, any audible alert is silenced during a second predetermined time period. Then, if the conditions for the operation of the alarm alert remain fulfilled after that interval, the sounding is resumed.

Even during the second predetermined time period of silence, an alert consisting of the flashing of the hazard lights can continue. This continues the deterrent effect towards intruders and still calls attention to the potential threat, while minimizing noise pollution.

However, during this second predetermined time period of silence, even if the conditions for activating an audible alarm arise that differ from any conditions up until that point, the alert controller maintains the silent period. Again, this enforces the reduction of noise pollution, enabling the meeting of any local ordinances in that regard.

Figure 6A:
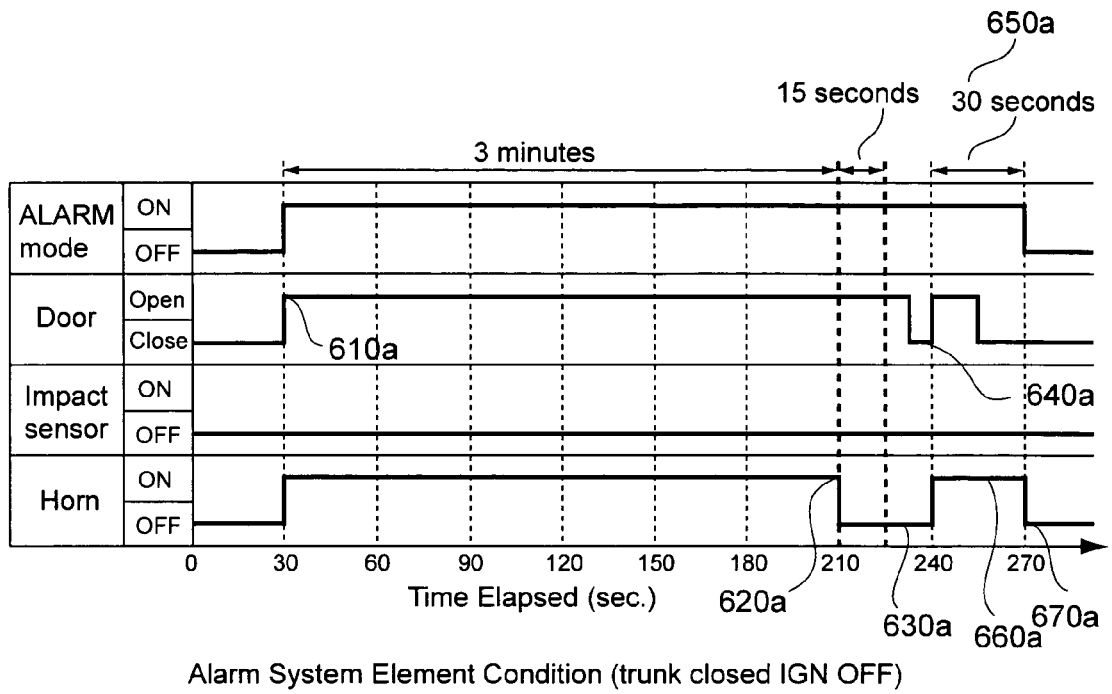
FIGS. 6A-H are charts illustrating various alert operating patterns.

These features of the present invention are illustrated in the alert pattern charts of FIGS. 6A-H. FIG. 6A shows the alert pattern related to an intruder opening a door of a parked vehicle with the security alarm system in an armed mode. The opening of the door at 610a enters the system into a warning mode and then to an alarm mode, which then activates an audible alert, i.e., the sounding of the horn.

The audible alert continues for the maximum time period of 3 minutes as shown as 620a, after which it enters the second, "horn beeping prohibition" interval of 15 seconds at 630a. However, as described above, alerts other than the audible alert may still continue during this period, to augment the effectiveness of the system.

During the succeeding 3 minute period, the horn remains silent, until the door is closed and then opened again at 640a. When the alert controller discerns this closing and re-opening of the door, it again commences the 30 second checking cycle at 650a and activates the audible alert. This sounding continues for at least the 30 second interval of 670a. Then, the next 30 second check at 680a determines that the door has been shut again, and silences the horn.

In this manner, the security alarm system of the present invention allows the continuation of the alerts as necessary, while still minimizing any noise pollution and other problems attendant to repetitive alarm alerts. It accomplishes this objective without requiring any disarming and re-arming by the user, as required by conventional systems. Also in contrast to conventional systems, it also allows the activation of the alerts by the identical sensor that caused previous alerts, thereby maintaining the effectiveness of the system.

Figure 6B:
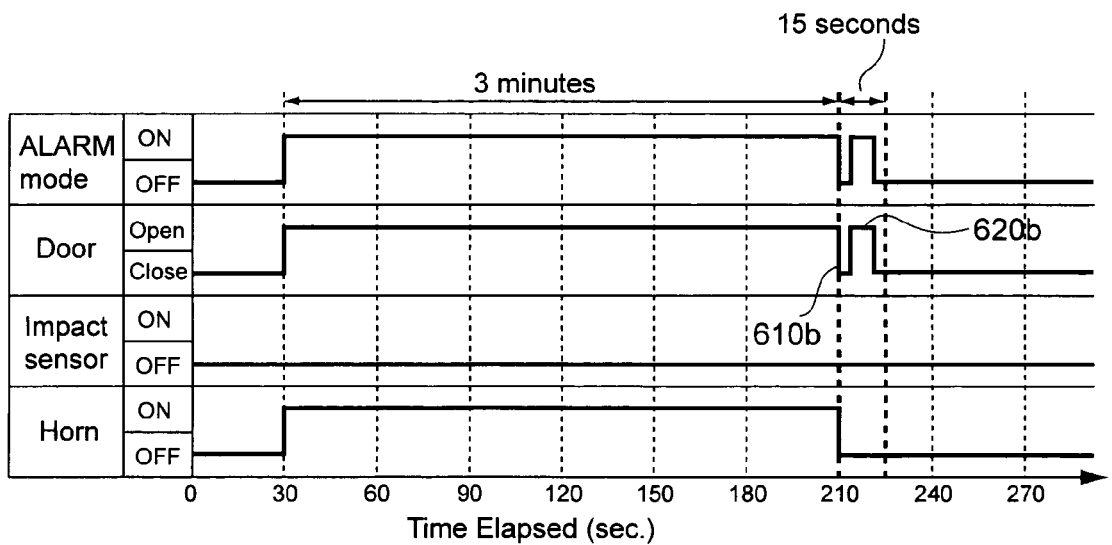

FIG. 6B illustrates a situation in which someone, for example the vehicle owner upon hearing the audible alert, closes the door at the expiration of the 3 minute time sounding period at 610b. Then, he re-opens and closes the door again at 620b during the 15 second "silent" interval. In this situation, due to the short duration time of the door re-opening, the system leaves the alarm mode, in accordance with the subroutine shown in FIG. 3. Thus, the horn sounding does not resume after the 15 second period. This arrangement can thereby accommodate such a user's attempting to stop the audible alert while still maintaining a security armed mode to detect any future threats.

Figure 6C:
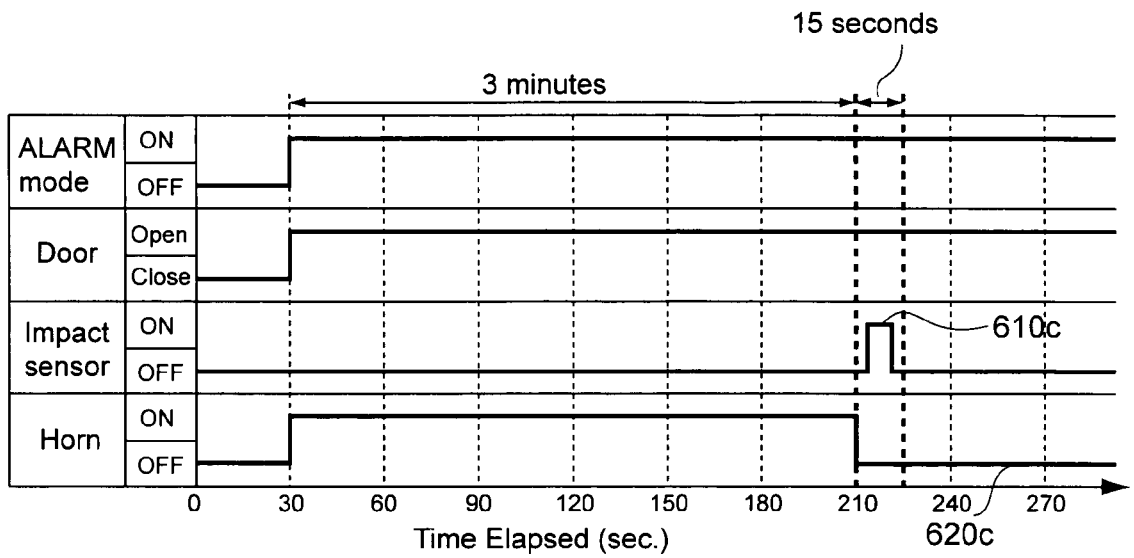
Figure 6D:
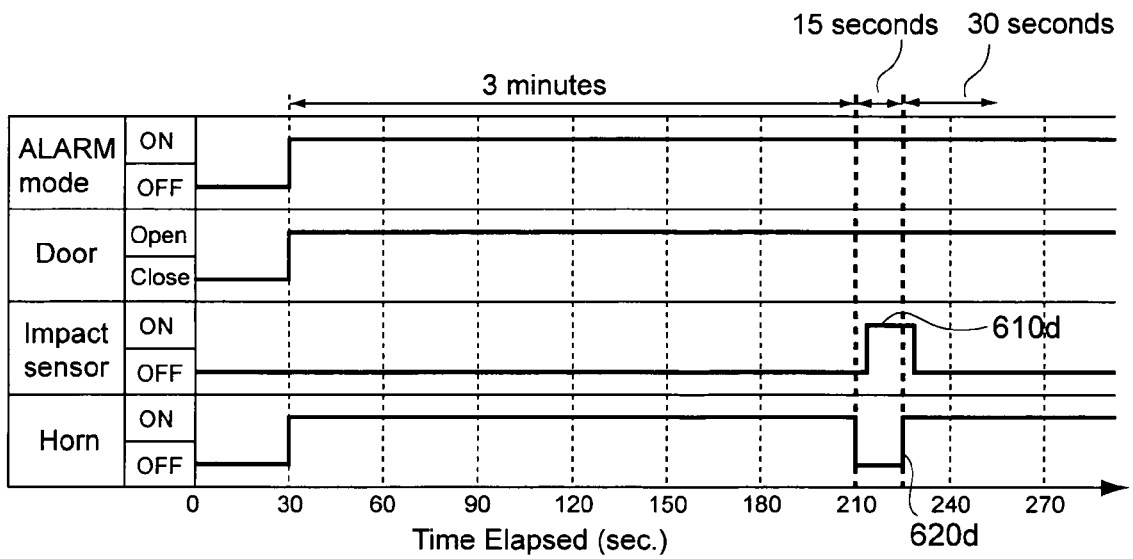

FIGS. 6C and 6D show a situation in which the door is left open, thereby activating the horn beeping. Then, during the 15 second interval, the impact sensor is activated at 610c and 610d. If the duration of the sensed vibration is brief, as in FIG. 6C, and ceases during the 15 seconds, it does not cause another audible alert to occur at 620c. However, if the duration is longer and exceeds the 15 seconds, the system discerns this new potential threat at a 30 second check point and re-commences the horn beeping at 620d.

In this way, the security alarm system reduces the potential for noise pollution due to non-intrusive, inadvertent shaking of the vehicle, while still maintaining audible alerts upon detecting threats in the form of continuous vibrations, such as the attempted moving of the vehicle, etc.

Figure 6E:
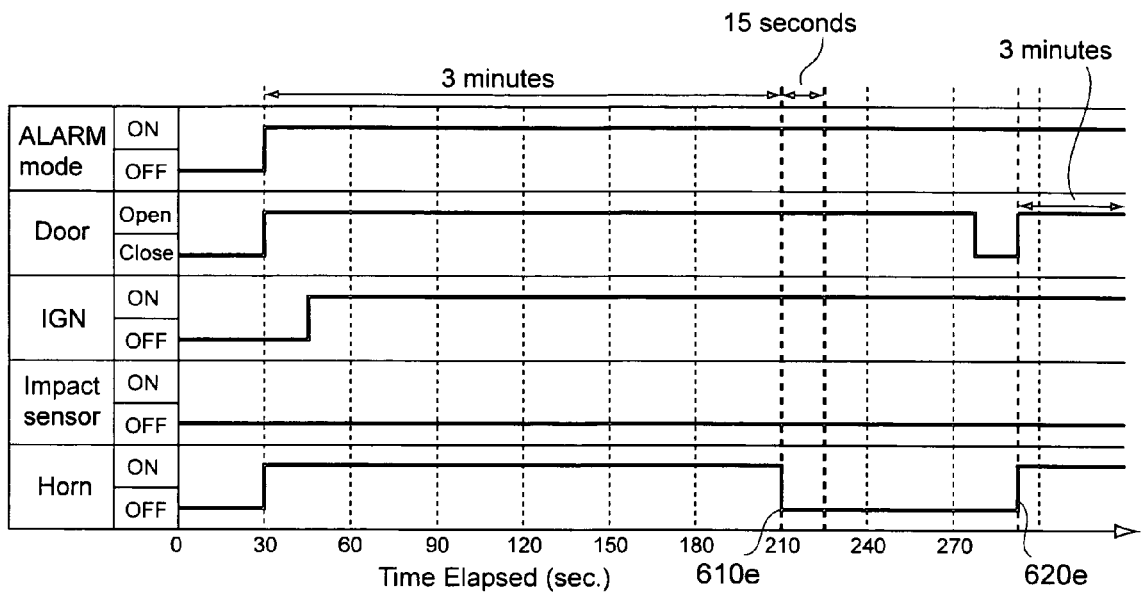

FIG. 6E illustrates a pattern when a thief or other unauthorized intruder opens the door and turns the ignition switch on. As described above, the horn will stop beeping and remain silent after the first 3 minute time period of beeping at 610e. However, any closing and re-opening of the door outside of the 15 second "silent" interval at 620e will re-start the horn beeping, to alert the vehicle owner and deter such an intruder. As shown in FIG. 6G, even if an intruder closes and re-opens the door sometime within the beginning and ending of the 15 second interval at 610g, the horn beeping will resume.

Figure 6F:
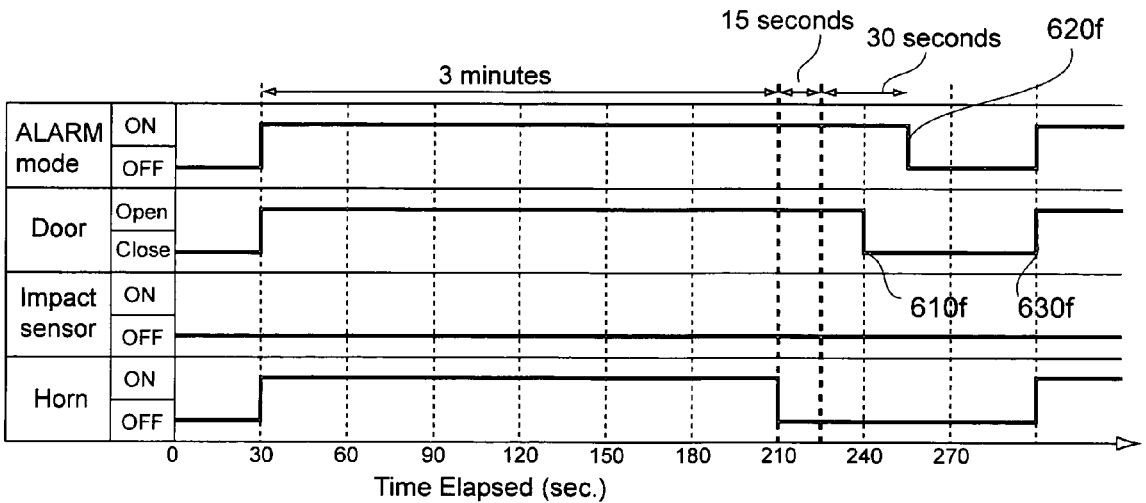
Figure 6G:
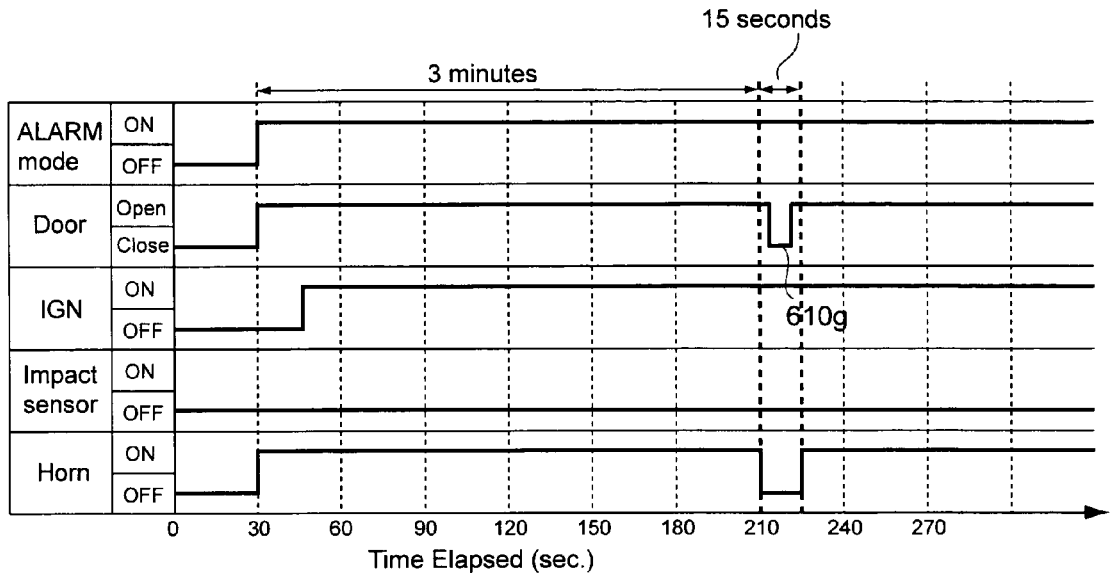

As shown in FIG. 6F, if the door is closed at 610f after the expiration of the 15 second interval by, for example the vehicle owner, the system exits the alarm mode at the next 30 second check at 620f. However, the system remains armed, and the triggering of the same cause (e.g., the subsequent opening of the door by an intruder) at 630f, will re-start the audible alert. This contrasts with prior art security alarm systems, in which the repeated activation of the identical trigger or sensor will not re-activate an alert.

FIGS. 6E, G and H depict situations in which an intruder turns the ignition on after gaining entry through opening a door. In another aspect of the present invention, the turning on of the ignition may be interpreted as another event that transfers the system from the armed mode to the alarm mode. With reference to FIG. 3, the detection of an "on" condition of the ignition, following activation of an alarm due to a door opening or impact sensing, may be a further condition (not currently illustrated) for remaining in the alarm mode.

Figure 6H:
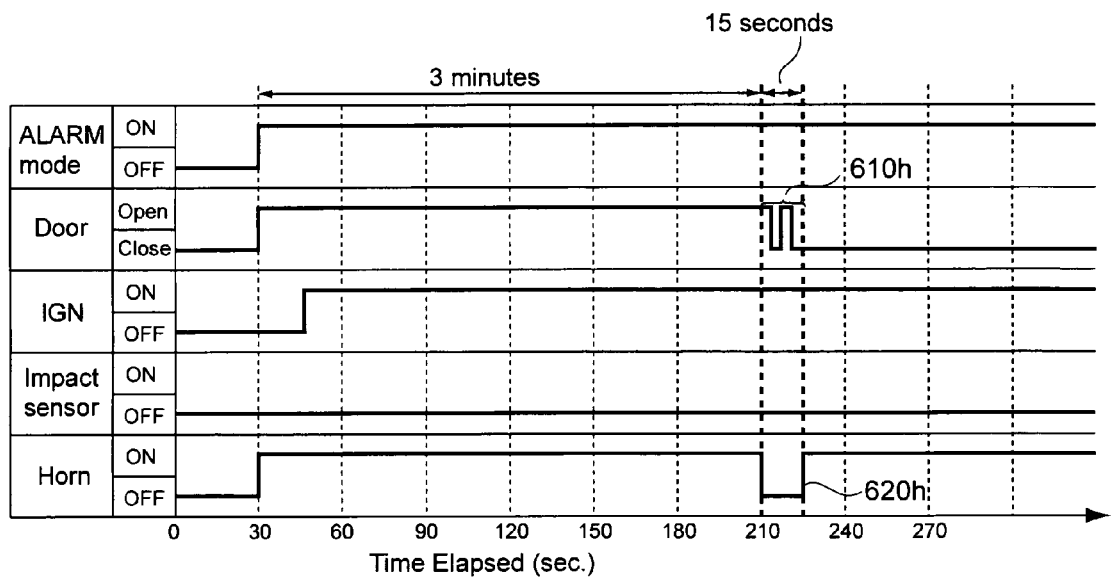

FIG. 6H shows the alert pattern when the intruder closes the door after the 3 minute sounding period, and then re-opens and re-closes the door during the following 15 second silence at 610h. In contrast to the similar pattern shown in FIG. 6B, the horn re-starts at 620h, due to the system detecting the ignition on state after the opening of the door. The system remains in the alarm mode (unlike in FIG. 6B) irregardless of the closing/opening of the door, due to the ignition remaining on.

Figure 7:
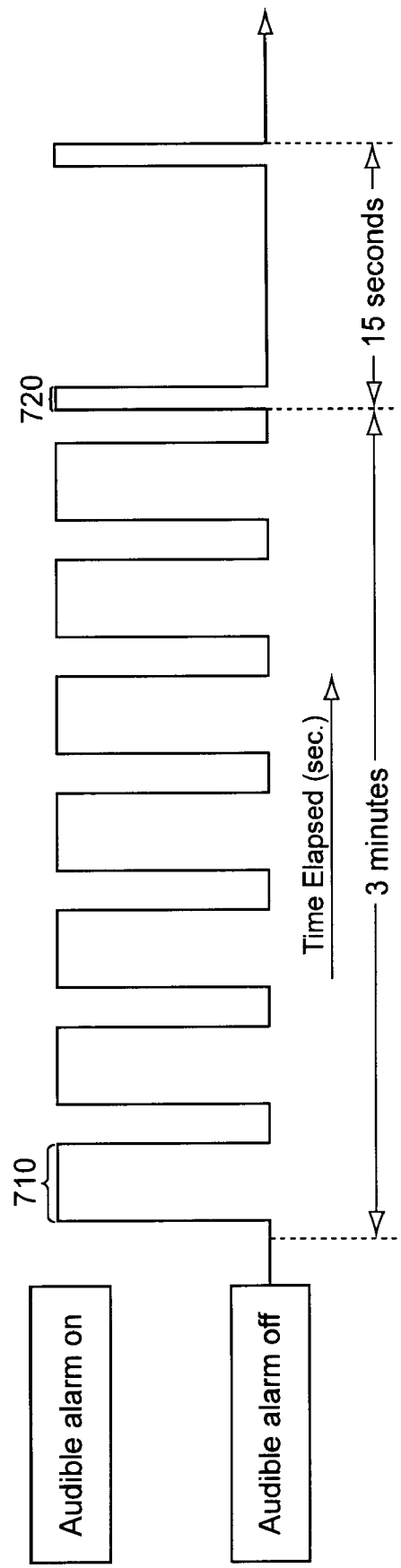
FIG. 7 is a chart illustrating exemplary cycling frequencies and operation interval times for the audible alarm.

In still another aspect of the present invention, the audible alert may not be completely silenced. As illustrated in the chart of FIG. 7, rather than a continuous audio alarm signal for 3 minutes, the alert controller may be programmed to activate audible alert intervals 710 of, for example, 7.5 seconds each during the 3 minute time period. Such alert intervals and frequency may be changed during the 15 second period, as well, as shown at 720. In FIG. 7, as an example, the audible alert only occurs twice during the 15 seconds, for short intervals.

In other words, with shorter activation times of the alert sounds, one can achieve the same effect, in terms of noise pollution, as reducing the volume of the alert sounds. By varying the frequency and lengths of audible alert intervals, one can achieve the objective of reducing any noise pollution, without entirely sacrificing the deterrent effects by having "silent" time periods.

In this embodiment, the first predetermined time and the second predetermined time are set as 3 minute and 15 seconds, respectively. However, they can be set to other lengths of time, as well.

Furthermore, it is preferable that the first predetermined time is set to be longer than the second predetermined time. The foregoing description of the embodiments of this invention have been presented for purposes of illustration and description. It is not intended to be exhaustive or to limit the embodiments of the invention to the form disclosed, and, obviously, many modifications and variations are possible. Such modifications and variations that may be apparent to a person skilled in the art are intended to be included within the scope of this invention as defined by the accompanying claims.

What is claimed is:

1. A security alarm system for a vehicle having an alert device, the alert device including an audible alert device, and the security alarm system comprising:
    an intrusion detector for detecting an intrusion event on the vehicle; and
    an alert controller for controlling the alert device,
        wherein the alert controller generates an activate instruction to activate the alert device responsive to the intrusion event detected by the intrusion detector and generates a deactivate instruction to deactivate at least the audible alert device after a first predetermined time interval from the generation of the activate instruction, and
        wherein the intrusion event includes an opening of a vehicle door, and after the opening of the vehicle door and after the first predetermined time interval, the alert controller prevents the generation of the activate instruction until the closing of the vehicle door.

2. The system of claim 1, wherein the alert controller further prevents a generation of an activate instruction of at least the audible alert device during at least a second predetermined time interval after the generation of the deactivate instruction.

3. The system of claim 2, wherein the alert device further includes a non-audible alert device for which the alert controller does not prevent the generation of the activate instruction during at least the second predetermined time interval.

4. A security alarm system for a vehicle having an alert device, the alert device including an audible alert device, and the security alarm system comprising:
    an intrusion detector for detecting an intrusion event on the vehicle; and
    an alert controller for controlling the alert device,
        wherein the alert controller generates an activate instruction to activate the alert device responsive to the intrusion event detected by the intrusion detector and generates a deactivate instruction to deactivate at least the audible alert device after a first predetermined time interval from the generation of the activate instruction, wherein the alert controller further prevents a generation of an activate instruction of at least the audible alert device during at least a second predetermined time interval after the generation of the deactivate instruction, and wherein the alert controller makes a detection or non-detection decision, at a predetermined decision interval, regarding the detection of the intrusion event by the intrusion detector, where the decision interval is shorter than the first predetermined time interval, and further where after the generation of the activate instruction, the alert controller stops the activation of the alert device in response to a non-detection decision.

5. The system of claim 4, wherein the alert device includes a non-audible alert device, for which the alert controller does not prevent the generation of the activate instruction during at least the second predetermined time interval.

6. The system of claim 4, wherein the intrusion event includes opening of a vehicle door, and wherein the alert controller prevents the generation of an additional activate instruction after the first predetermined time interval unless the vehicle door has been closed.

7. The system of claim 4, wherein the alert controller does not prevent generation of an activate instruction after the second predetermined time interval has elapsed.

8. A security alarm system for a vehicle, comprising:
an intrusion detector for detecting an intrusion event on the vehicle;
an audible alert device;
a non-audible alert device; and
an alert controller in communication with the intrusion detector and the audible and non-audible alert devices, the alert controller for controlling the audible and non-audible alert devices;

wherein the alert controller generates an activate instruction to activate the audible and non-audible alert devices responsive to the intrusion event and generates a deactivate instruction to deactivate the audible alert device after a first predetermined time interval after the generation of the activate instruction, wherein the alert controller prevents generation of an activate instruction to the audible alert device during a second predetermined time interval after the first predetermined time interval, wherein the alert controller does not prevent generation of an activate instruction to the non-audible alert device during the second predetermined time interval, wherein the alert controller makes a detection or non-detection decision regarding the detection of the intrusion event by the intrusion detector at a predetermined decision interval, wherein after the generation of an activate instruction, the alert controller generates a deactivate instruction to at least the audible alert device in response to a non-detection decision.

9. The system of claim 8, wherein the predetermined decision interval is shorter than the first predetermined time interval.

10. The system of claim 8, wherein after the generation of an activate instruction, the alert controller generates a deactivate instruction to the non-audible alert device in response to a non-detection decision.

11. The system of claim 8, wherein the alert controller does not prevent generation of an activate instruction to the audible alert device after the second predetermined time interval has elapsed.

* * * * *